Feb. 26, 1963   E. C. OLSON   3,079,542
CURRENT SUPPLY APPARATUS
Filed March 29, 1960
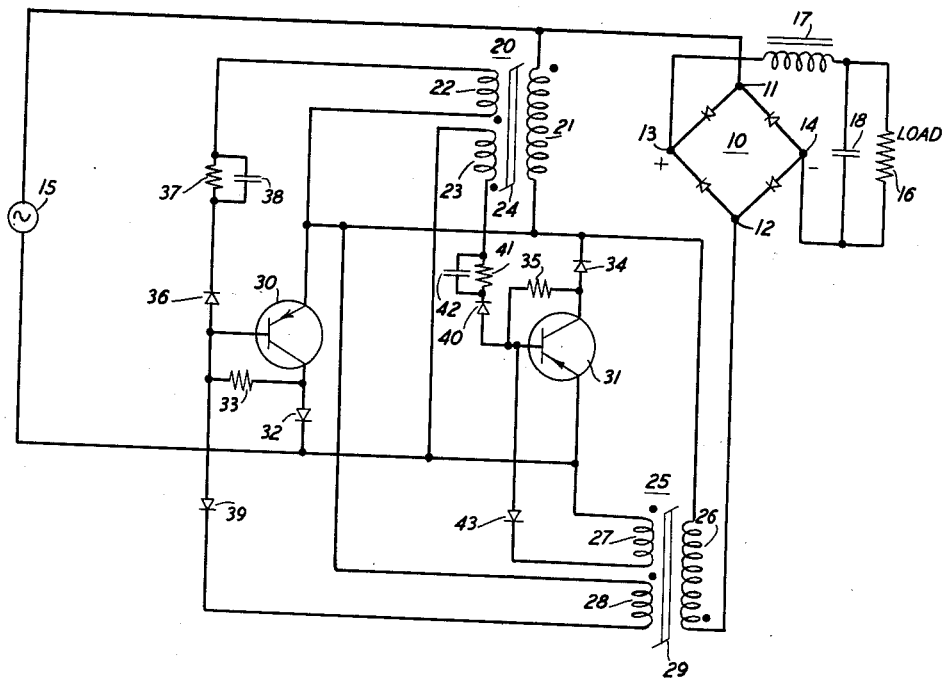
INVENTOR
E.C. OLSON
BY
G.F. Heuerman
ATTORNEY

United States Patent Office 3,079,542
Patented Feb. 26, 1963

3,079,542
CURRENT SUPPLY APPARATUS
Everette C. Olson, Columbus, Ohio, assignor, by mesne assignments, to North Electric Company, Galion, Ohio, a corporation of Ohio
Filed Mar. 29, 1960, Ser. No. 18,390
13 Claims. (Cl. 323—22)

This invention relates to current supply apparatus and more particularly to apparatus for controlling the supply of rectified alternating current to a load to maintain the load voltage substantially constant.

An object of the invention is to provide improved apparatus comprising a saturable core transformer for controlling the supply of current from an alternating-current supply source to a load.

A further object of the invention is to provide improved current supply apparatus for maintaining a load voltage substantially constant irrespective of variations of peak amplitude of an alternating-current supply source.

In a specific embodiment of the invention, herein shown and described for the purpose of illustration, a rectifier-filter is provided for rectifying and supplying to a load current from an alternating-current supply source the voltage of which may vary and the fundamental frequency of which is substantially constant. There is provided for controlling the supply of current from the supply source to the rectifier a first transformer having a saturable core of substantially square hysteresis loop magnetic material. Means are provided for connecting the terminals of a winding of the transformer to the input terminals respectively of the rectifier.

Current is supplied from the supply source to the transformer alternately through a first current path comprising a first rectifying element and the emitter-collector path of a first transistor in series and a second current path comprising a second rectifying element and the emitter-collector path of a second transistor in series. The core of the first transformer is thus caused to saturate alternately in opposite directions. Conduction is initiated in the transistors alternately in succession in response to voltages derived from a second transformer having a saturable core of substantially square hysteresis loop magnetic material and having a winding through which current is supplied to the rectifier input. The core of the second transformer is also caused to saturate alternately in opposite directions. Conduction in each transistor is maintained in response to a voltage derived from the first transformer over a period commencing prior to the time of saturation of the core of the second transformer and ending in response to the saturation of the core of the first transformer.

Each transistor will thus be made conductive at a predetermined instant early in a half cycle period of the supply source to cause nearly the full voltage of the supply source to be impressed across the winding of the first transformer. As the supply source voltage increases, the time required for saturating the core of the first transformer will decrease and vice versa. When the core saturates, of course, the voltage across the transformer winding will be reduced to zero. If the voltage pulses across the first transformer winding are plotted with the instantaneous voltages as ordinates and time as the abscissa, the area of the successive pulses will remain constant irrespective of voltage changes of the supply source. The constant area pulses are averaged by the rectifier-filter to maintain a substantially constant voltage across the load when the frequency of the supply source is constant. Each transistor is made non-conductive when the core of the first transformer saturates to greatly increase the resistance of, or effectively interrupt, the current path for supplying current from the supply source to the first transformer winding the impedance of which is very low when the transformer core is saturated.

The invention will now be described in greater detail with reference to the accompanying drawing the single FIGURE of which is a schematic view of a current supply circuit embodying the invention.

Referring now to the drawing, there is provided apparatus comprising a bridge rectifier 10 having a pair of input terminals 11, 12 and positive and negative output terminals 13 and 14, respectively, for supplying rectified current from an alternating-current supply source 15 to a load 16 through a ripple filter having a series inductive reactor 17 and a shunt capacitor 18. The voltage and wave shape of the supply source 15 may vary but its fundamental frequency is substantially constant.

There is provided for controlling the current supplied to the rectifier 10 to maintain the load voltage substantially constant a control circuit comprising a first transformer 20 having windings 21, 22 and 23 on a core 24 of saturable substantially square hysteresis loop magnetic material, a second transformer 25 having windings 26, 27 and 28 on a saturable core 29 of substantially square hysteresis loop magnetic material and a pair of p-n-p type transistors 30 and 31.

One terminal of the supply source 15 is connected to a first terminal of transformer winding 21 and to the rectifier input terminal 11. The second terminal of transformer winding 21 is connected through transformer winding 26 to rectifier input terminal 12. The emitter of transistor 30 is connected to the common terminal of windings 21 and 26 and the collector of the transistor is connected through a rectifying element 32 to the lower terminal of the supply source 15, as viewed in the drawing. The collector of transistor 30 is also connected through a resistor 33 of 3,900 ohms, for example, to the base of the transistor. The emitter of transistor 31 is connected to the lower terminal of the supply source 15 and its collector is connected through a rectifying element 34 to the common terminal of transformer windings 21 and 26. The collector of transistor 31 is also connected through a resistor 35 of 3,900 ohms, for example, to the base of the transistor.

There is provided a series circuit which may be traced from the base of transistor 30 through a rectifying element 36, a resistor 37 of 4 ohms, for example, shunted by a condenser 38 of 150 microfarads, for example, and transformer winding 22 to the emitter of transistor 30. A second circuit connecting the base and emitter of transistor 30 may be traced from its base, through a rectifying element 39 and transformer winding 28 to the emitter of the transistor. There is provided a circuit which may be traced from the base of transistor 31, through a rectifying element 40, a resistor 41 of 4 ohms, for example, shunted by a condenser 42 of 150 microfarads, for example, and winding 23 to the emitter of transistor 31. A second circuit connecting the base and emitter of transistor 31 may be traced from its base, through a rectifying element 43 and transformer winding 27 to the emitter of the transistor.

The current supply circuit is believed to function substantially as described below to supply a direct current up to a maximum of about 8 amperes to the load 16 while maintaining the voltage across the load substantially constant at about 12 volts irrespective of voltage changes of the supply source 15. During a positive half cycle period of the alternating-current supply source, for example, when the instantaneous voltage of the source increases to a value larger than the load voltage, current will flow from a terminal of the supply source 15 through a circuit comprising rectifier 10, filter 17, 18, load 16, winding 26 of transformer 25, into the emitter and out of the base of transistor 30, resistor 33 and rectifying element 32 in its forward or low resistance direction to the other terminal of the source 15. The resulting voltage induced in transformer winding 28 causes current to flow into the emitter and out of the base of transistor 30 and through rectifying element 39 in its forward direction. Transistor 30 is thus made substantially fully conductive and current will flow from the upper terminal of the supply source 15 through winding 21 of transformer 20, into the emitter and out of the collector of transistor 30 and through rectifying element 32 in its forward direction to the lower terminal of the source 15. The resulting voltage induced in transformer winding 22 will cause current to flow into the emitter and out of the base of transistor 30, through rectifying element 36 in its forward direction and through resistor 37. While the transistor 30 is conductive during a portion of a positive half cycle period of the supply source 15, substantially the entire voltage of the source appears across the transformer winding 21 and this voltage is impressed across the input of rectifier 10 in series with the transformer winding 26. The core 29 of transformer 25 will saturate to reduce the voltages across each of its windings substantially to zero and subsequently the core of transformer 20 will saturate to reduce the voltages across each of its windings substantially to zero. The voltage due to the charging of condenser 38 is in an opposing direction with respect to the voltage across winding 22 so that, when the voltage across winding 22 falls to zero, the transistor 30 becomes non-conductive.

During each negative half cycle period of the supply source 15, conduction in transistor 31 is similarly initiated due to the current flow in winding 26 and the resulting voltage from winding 27 impressed upon the emitter-base circuit of transistor 31. The transistor 31 is held conductive by the voltage induced in transformer winding 23 because of the current from the supply source 15 flowing in a circuit comprising the emitter-collector path of transistor 31, rectifying element 34 and winding 21, all in series. When the core 24 of transformer 20 saturates, the voltage across winding 23 is reduced substantially to zero with the result that conduction in the transistor 31 is interrupted.

The peak amplitude of the successive voltage pulses thus produced across the transformer winding 21 and impressed upon the input circuit of rectifier 10 increases as the peak voltage of the supply source 15 increases and vice versa. However, the core 24 saturates earlier, and, therefore, the voltage pulse across winding 21 terminates earlier, in a half cycle period when the supply voltage is large than when the supply voltage is relatively small. The area enclosed by a curve connecting the instantaneous voltages and the time axis is the same for each voltage pulse across the winding 21. The circuit comprising rectifier 10 and filter 17, 18 averages the voltage impressed upon the rectifier-filter circuit from the transformer winding 21 to maintain the direct voltage across the load 16 substantially constant.

When transformer core 24 saturates and one of the transistors 30 and 31 is fully conducting, a low impedance path or substantially a short-circuit is placed across the supply source 15 for an instant. Since the voltage across the fully conducting transistor is very low, the power dissipation in the transistor is also very low. It is desirable, of course, to insert a very high impedance in the circuit or to substantially interrupt the circuit to eliminate the short-circuit as soon as possible after the core saturates. For efficient operation, it is also desirable that the impedance in series with the source and the transformer winding 21 be as low as possible prior to saturation of the core 24. Because the base current of the transistor drops to zero immediately when core 24 saturates, the transistor thus assumes its high impedance state to substantially interrupt the circuit to thereby remove the short-circuit. In this state, the power dissipation in the transistor is also very small because the current flowing through the transistor is very small. Each transistor thus switches from one low loss state to another low loss state when the core 24 saturates. Damage to the transistors is thus avoided.

What is claimed is:

1. In combination, a transformer having a core of saturable substantially square hysteresis loop magnetic material, and means comprising said transformer for controlling the supply of current to a load circuit from a source of alternating current having a substantially constant fundamental frequency and having a peak voltage which may vary, said means comprising means responsive to current in said load circuit for completing a current path for supplying from said source to said transformer current for causing said core to saturate during a half cycle period of said alternating-current source, and means responsive to the saturation of said core for interrupting said current path.

2. In combination, means for controlling the supply of current to a load circuit from a source of alternating current the voltage of which may vary and having a substantially constant fundamental frequency comprising a transformer having a winding on a saturable core of substantially square hysteresis loop magnetic material, and means responsive to current in said load circuit for completing a current path for supplying current from said source to said winding to cause said core to saturate and for subsequently interrupting said current path in response to saturation of said core.

3. Apparatus for controlling the supply of current to a load circuit from a source of alternating current having a fundamental frequency which is substantially constant and having a peak voltage which may vary comprising a transformer having a winding on a saturable core of substantially square hysteresis loop magnetic material, means responsive to current in said load circuit for completing a current path for supplying from said source to said winding current for causing said core to saturate, and means for interrupting said current path in response to saturation of said core.

4. Apparatus for controlling the supply of current to a load circuit from a source of alternating current having a fundamental frequency which is substantially constant and having a peak voltage which may vary comprising a transformer having a winding on a core of saturable substantially square hysteresis loop magnetic material, means responsive to current in said load circuit for initiating the completion of a current path for supplying current from said source to said winding, and means responsive to a voltage derived from said transformer for holding said current path completed for a period during which the flux in said core is increasing toward saturation, said derived voltage decreasing substantially to zero in response to saturation of said core to cause the interruption of said current path.

5. Apparatus for controlling the supply of current to a load circuit from a supply source of alternating current having a fundamental frequency which is substantially constant and having a peak voltage which may vary, comprising a first and a second transformer each having a core of saturable substantially square hysteresis loop magnetic material, said first transformer having a first winding, said second transformer having a second winding, means for supplying said load current through said second winding to cause the core of said second transformer to saturate, means for deriving a first voltage in response to the flux in said second transformer core increasing toward saturation, means responsive to said first voltage for initiating the completion of a current path for supplying current from said source to said first winding to cause the flux in said first transformer core to increase toward saturation, means for deriving a second voltage in response to said increase of flux in said first transformer core, and means responsive to said second derived voltage for maintaining said current path completed during a period starting prior to the time of saturation of said second transformer core and ending substantially at the time of saturation of said first transformer core.

6. Means for supplying current to a load circuit from a supply source of alternating current the voltage of which may vary and having a fundamental frequency which is substantially constant comprising a first transformer having a first winding on a first saturable core of substantially square hysteresis loop magnetic material, a second transformer having a second winding on a second saturable core of substantially square hysteresis loop magnetic material, means for supplying said load current through said second winding to cause said second core to saturate, a transistor for completing a current path for supplying current from said source to said first winding to cause said first core to saturate when said transistor is conducting, means for initiating conduction in said transistor in response to increase of flux in said second core, and means for subsequently maintaining conduction in said transistor in response to increase of flux in said first core, saturation of said first core causing said transistor to return to its non-conducting state.

7. Means for supplying current to a load circuit from a supply source of alternating current the voltage of which may vary and having a fundamental frequency which is substantially constant comprising a first transformer having a first winding on a first saturable core of substantially square hysteresis loop magnetic material, a second transformer having a second winding on a second saturable core of substantially square hysteresis loop magnetic material, means for supplying said load circuit current through said second winding to cause the flux in said second core to change from saturation in one direction to saturation in the opposite direction in response to a reversal of said load circuit current, a first and a second transistor for completing current paths for supplying current from said source to said first winding during successive half cycle periods respectively of said supply source when said transistors respectivel are conducting, means responsive to change of flux in said second core for initiating conduction in said transistors alternately in succession during successive half cycle periods of said supply source, and means for subsequently maintaining conduction in said transistors alternately in succession in response to change of flux in said first core during successive half cycle periods of said supply source, saturation of said first core causing said transistors alternately in succession to return to the non-conducting state.

8. Apparatus for supplying current to a load from a supply source of alternating current the voltage of which may vary and having a fundamental frequency which is substantially constant, a first transformer for controlling the supply of current from said source to said load, said first transformer having a first winding on a first saturable core of substantially square hysteresis loop magnetic material, switching means for completing a circuit for supplying current from said source to said first winding to cause said first core to saturate alternately in opposite directions during successive half cycle periods of said supply source, a second transformer having a second winding on a second saturable core of substantially square hysteresis loop magnetic material, means for supplying said current to said load through said second winding to cause said second core to saturate alternately in opposite directions during successive half cycle periods of said supply source, and means responsive to changes of flux in said second core for in part at least controlling said switching means.

9. Apparatus for supplying current to a load from a supply source of alternating current the voltage of which may vary and having a substantially constant fundamental frequency comprising a transformer having a winding on a saturable core of substantially square hysteresis loop magnetic material, means for connecting the terminals of said winding to the terminals respectively of said load, means for connecting a first terminal of said winding to a first terminal of said supply source, a first current path for connecting the second terminal of said winding to the second terminal of said supply source comprising a first rectifying element and a first transistor in series, a second current path for connecting the second terminal of said winding to the second terminal of said supply source comprising a second transistor and a second rectifying element in series, said first transistor and first rectifying element being poled to conduct current of one polarity only and said second transistor and second rectifying element being poled to conduct current of opposite polarity only, and means for deriving from said transformer in response to changes of flux in said core voltages for controlling the conductances of said transistors respectively.

10. Apparatus for supplying current to a load from a supply source of alternating current the voltage of which may vary and having a substantially constant fundamental frequency comprising a first transformer having a first, a second and a third winding on a first core of saturable substantially square hysteresis loop magnetic material, a second transformer having a fourth, a fifth and a sixth winding on a second core of saturable substantially square hysteresis loop magnetic material, means for connecting a first terminal of said load and a first terminal of said first winding to a first terminal of said supply source, means comprising said fourth winding for connecting the second terminal of said load to the second terminal of said first winding, a first and a second transistor each having an emitter, a collector and a base, a first current path for connecting the second terminal of said first winding to the second terminal of said supply source comprising the emitter-collector path of said first transistor and a first rectifying element in series, a second current path for connecting the second terminal of said first winding to the second terminal of said supply source comprising the emitter-collector path of said second transistor and a second rectifying element in series, the emitter-collector path of said first transistor and said first rectifying element being poled to conduct current of one polarity only of said supply source and the emitter-collector path of said second transistor and said second rectifying element being poled to conduct current of opposite polarity only, a third, a fourth, a fifth and a sixth rectifying element, a circuit comprising said second winding, said third rectifying element and the emitter-base path of said first transistor in series, a circuit comprising said fifth winding, said fourth rectifying element and the emitter-base path of said first transistor in series, a circuit comprising said third winding, said fifth rectifying element and the emitter-base path of said second transistor in series, and a circuit comprising said sixth winding, said sixth rectifying element and the emitter-base path of said second transistor in series, each of said third and fourth rectifying elements being poled to conduct current in the same direction as the emitter-base path of said first transistor and each of said fifth and sixth rectifying elements being poled to conduct current in the same direction as the emitter-base path of said second transistor.

11. Apparatus in accordance with claim 10 in which there are provided means in said circuit comprising said second winding for holding said first transistor nonconductive in the absence of voltages across said second and fifth windings, and means in said circuit comprising said third winding for holding said second transistor nonconductive in the absence of voltages across said third and sixth windings.

12. In combination, a load, a transformer having a core of saturable substantially square hysteresis loop magnetic material, and means comprising said transformer for supplying current from an alternating-current supply source of substantially fixed fundamental frequency to said load, said means comprising means for completing a low resistance circuit for supplying current from said source to said transformer in response to an increase of current in said load circuit near the beginning of each half cycle period of said supply source and for subsequently interrupting said circuit during each half cycle period in response to the saturation of said core.

13. In combination, a first and a second transformer each having a winding on a core of saturable substantially square hysteresis loop magnetic material, means comprising said first transformer for controlling the supply of current to a load circuit from an alternating-current source of substantially constant fundamental frequency the voltage of which may vary, means for connecting said winding of said second transformer in series in said load circuit, means responsive to a voltage derived from said second transformer during periods when said second transformer core is unsaturated for causing the completion of a low resistance path for supplying current from said source to said winding of said first transformer, and means responsive to a voltage derived from said first transformer for maintaining said low resistance path for a period including the time at which said second transformer core becomes saturated and ending at the time that said first transformer core becomes saturated.

References Cited in the file of this patent

UNITED STATES PATENTS

| | | |
|---|---|---|
| 2,591,918 | Cole et al. | Apr. 8, 1952 |
| 2,632,870 | Boxer et al. | Mar. 24, 1953 |
| 2,753,510 | Smith | July 3, 1956 |
| 2,764,725 | Buie | Sept. 25, 1956 |
| 2,772,370 | Bruce et al. | Nov. 27, 1956 |
| 2,798,571 | Schaelchlin et al. | July 9, 1957 |